US010712126B2

(12) United States Patent
Crist et al.

(10) Patent No.: US 10,712,126 B2
(45) Date of Patent: Jul. 14, 2020

(54) SYSTEMS AND METHODS FOR COOPERATION AMONG WEAPONS, HOLSTERS, AND RECORDERS

(71) Applicant: TASER International, Inc., Scottsdale, AZ (US)

(72) Inventors: Timothy J. Crist, Tucson, AZ (US); Daniel J. Wagner, Scottsdale, AZ (US); Mark A. Hanchett, Mesa, AZ (US); Matthew J. Morstad, Phoenix, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 381 days.

(21) Appl. No.: 15/244,974

(22) Filed: Aug. 23, 2016

(65) Prior Publication Data

US 2017/0059274 A1 Mar. 2, 2017

Related U.S. Application Data

(60) Provisional application No. 62/209,786, filed on Aug. 25, 2015.

(51) Int. Cl.
*F41C 33/02* (2006.01)
*F41A 17/06* (2006.01)
*H04N 7/18* (2006.01)

(52) U.S. Cl.
CPC .......... *F41C 33/029* (2013.01); *F41A 17/06* (2013.01); *F41A 17/063* (2013.01); *F41C 33/0263* (2013.01); *H04N 7/188* (2013.01)

(58) Field of Classification Search
CPC combination set(s) only.
See application file for complete search history.

(56) References Cited

U.S. PATENT DOCUMENTS 4,713,889 A 12/1987 Santiago
5,479,149 A 12/1995 Pike
(Continued)

FOREIGN PATENT DOCUMENTS

KR 20000037802 7/2000
TW 201229932 A1 7/2012
(Continued)

OTHER PUBLICATIONS

Richard Stallman, "Controlling When the Cameras Record", MIT Technology Review, published Jul. 23, 2015, available at www.technologyreview.com/s/539631/controlling-when-the-cameras-record (submitted herewith; retrieved: Jan. 27, 2020).
(Continued)

*Primary Examiner* — Alexander Gee
(74) *Attorney, Agent, or Firm* — Letham Law Firm

(57) ABSTRACT

A detector monitors the presence, absence, insertion, and/or removal of an object in a holster. The detector broadcasts a message to an electronic device reporting whether the object, such as a weapon, has been removed from the holster and/or if the holster lock has been unlocked. The detector repeatedly probes for the presence of the object in the holster. The electronic device, in response to authenticating the message, may control the recording of audio, video, and/or other data in conjunction with the insertion or withdrawal. The detector stores information about when an object has been removed or inserted from the holster and provides it the electronic device.

18 Claims, 4 Drawing Sheets

(56) References Cited

U.S. PATENT DOCUMENTS

| | | | |
|---|---|---|---|
| 5,525,966 A | 6/1996 | Parish | |
| 5,828,301 A | 10/1998 | Sanchez | |
| 6,735,907 B2 | 5/2004 | Stevens | |
| 6,831,556 B1 | 12/2004 | Boykin | |
| 6,918,519 B2 | 7/2005 | Vor Keller | |
| 7,158,167 B1* | 1/2007 | Yerazunis | H04N 5/772 |
| | | | 348/61 |
| 7,168,198 B2 | 1/2007 | Newkirk | |
| 7,389,604 B2 | 6/2008 | Newkirk | |
| 7,525,568 B2 | 4/2009 | Raghunath | |
| 7,714,720 B2 | 5/2010 | Hietanen | |
| 7,937,880 B1 | 5/2011 | Fidlow | |
| 9,135,808 B2 | 9/2015 | Johnson | |
| 9,140,509 B2 | 9/2015 | Sullivan | |
| 9,217,616 B2* | 12/2015 | Sullivan | F41A 17/063 |
| 2001/0033228 A1* | 10/2001 | Kisreman | F41C 33/0263 |
| | | | 340/568.1 |
| 2002/0030666 A1* | 3/2002 | Philipp | G06F 3/0213 |
| | | | 345/168 |
| 2002/0070866 A1 | 6/2002 | Newham | |
| 2002/0153396 A1 | 10/2002 | French | |
| 2005/0002668 A1* | 1/2005 | Gordon | F41A 33/00 |
| | | | 396/502 |
| 2005/0024326 A1* | 2/2005 | Betts-LaCroix | G06F 3/0416 |
| | | | 345/156 |
| 2005/0066567 A1* | 3/2005 | Newkirk | F41A 17/06 |
| | | | 42/70.11 |
| 2005/0224537 A1 | 10/2005 | Rassias | |
| 2006/0082730 A1* | 4/2006 | Franks | F41A 17/06 |
| | | | 352/95 |
| 2006/0098088 A1* | 5/2006 | Raghunath | H04N 5/782 |
| | | | 348/61 |
| 2006/0208857 A1 | 9/2006 | Wong | |
| 2007/0028501 A1 | 2/2007 | Fressola | |
| 2007/0257987 A1 | 11/2007 | Wang | |
| 2008/0061991 A1* | 3/2008 | Urban | F41C 33/0209 |
| | | | 340/573.1 |
| 2008/0112698 A1* | 5/2008 | Ray | G03B 17/00 |
| | | | 396/56 |
| 2009/0058429 A1* | 3/2009 | Harris | G06F 1/1616 |
| | | | 324/686 |
| 2009/0207252 A1 | 8/2009 | Raghunath | |
| 2010/0289648 A1* | 11/2010 | Ree | G08B 13/19602 |
| | | | 340/573.1 |
| 2012/0112365 A1* | 5/2012 | Ausserlechner | G01R 15/20 |
| | | | 257/777 |
| 2012/0233384 A1 | 9/2012 | Charles | |
| 2012/0276954 A1 | 11/2012 | Kowalsky | |
| 2012/0319974 A1* | 12/2012 | Kim | G06F 3/044 |
| | | | 345/173 |
| 2013/0169587 A1* | 7/2013 | Kim | G06F 3/0412 |
| | | | 345/174 |
| 2013/0192367 A1* | 8/2013 | Osawa | G01P 9/04 |
| | | | 73/504.12 |
| 2013/0217332 A1 | 8/2013 | Altman | |
| 2014/0038668 A1 | 2/2014 | Vasavada | |
| 2014/0162584 A1 | 6/2014 | Cope | |
| 2014/0290109 A1 | 10/2014 | Stewart | |
| 2014/0290110 A1 | 10/2014 | Stewart | |
| 2014/0360073 A1 | 12/2014 | Stewart | |
| 2015/0147970 A1 | 5/2015 | Tan | |
| 2015/0184978 A1* | 7/2015 | Hedeen | F41G 1/35 |
| | | | 42/114 |
| 2015/0198406 A1* | 7/2015 | Ling | F41C 33/0254 |
| | | | 42/90 |
| 2015/0254968 A1 | 9/2015 | Sanders | |
| 2015/0256990 A1* | 9/2015 | Vilrokx | H04W 76/50 |
| | | | 455/404.1 |
| 2015/0369554 A1 | 12/2015 | Kramer | |
| 2015/0369559 A1 | 12/2015 | Del Rosario | |
| 2016/0027280 A1* | 1/2016 | Khan | G08B 21/0469 |
| | | | 340/573.1 |
| 2016/0033221 A1 | 2/2016 | Schmehl | |
| 2016/0065908 A1* | 3/2016 | Chang | G06F 12/0246 |
| | | | 348/158 |
| 2016/0241807 A1 | 8/2016 | Kovac | |
| 2016/0286156 A1* | 9/2016 | Kovac | H04N 5/772 |
| 2016/0366327 A1* | 12/2016 | Kusens | H04N 5/23203 |
| 2018/0274876 A1* | 9/2018 | Stewart | F41A 35/00 |

FOREIGN PATENT DOCUMENTS

| | | |
|---|---|---|
| WO | 2006-085945 A2 | 8/2006 |
| WO | WO2008042990 A1 | 4/2008 |
| WO | WO2008057743 A1 | 5/2008 |
| WO | WO2008140569 A1 | 11/2008 |
| WO | WO2014163653 A1 | 10/2014 |
| WO | WO2015156921 A1 | 10/2015 |

OTHER PUBLICATIONS

Annalee Newitz, "Police Body Cams Should Turn on Automatically, Says Richard Stallman", Gizmodo, published Aug. 3, 2015, available at www.gizmodo.com/1721873590 (submitted herewith; retrieved: Jan. 27, 2020).

* cited by examiner

SYSTEMS AND METHODS FOR COOPERATION AMONG WEAPONS, HOLSTERS, AND RECORDERS

FIELD OF THE INVENTION

Embodiments of the present invention relate to a detector for detecting the presence, absence, insertion, or removal of an object in a holster and for providing a notice responsive to detecting.

BRIEF DESCRIPTION OF THE DRAWING

Embodiments of the present invention will be described with reference to the drawing, wherein like designations denote like elements, and.

DETAILED DESCRIPTION OF THE PREFERRED EMBODIMENTS

Figure 1:
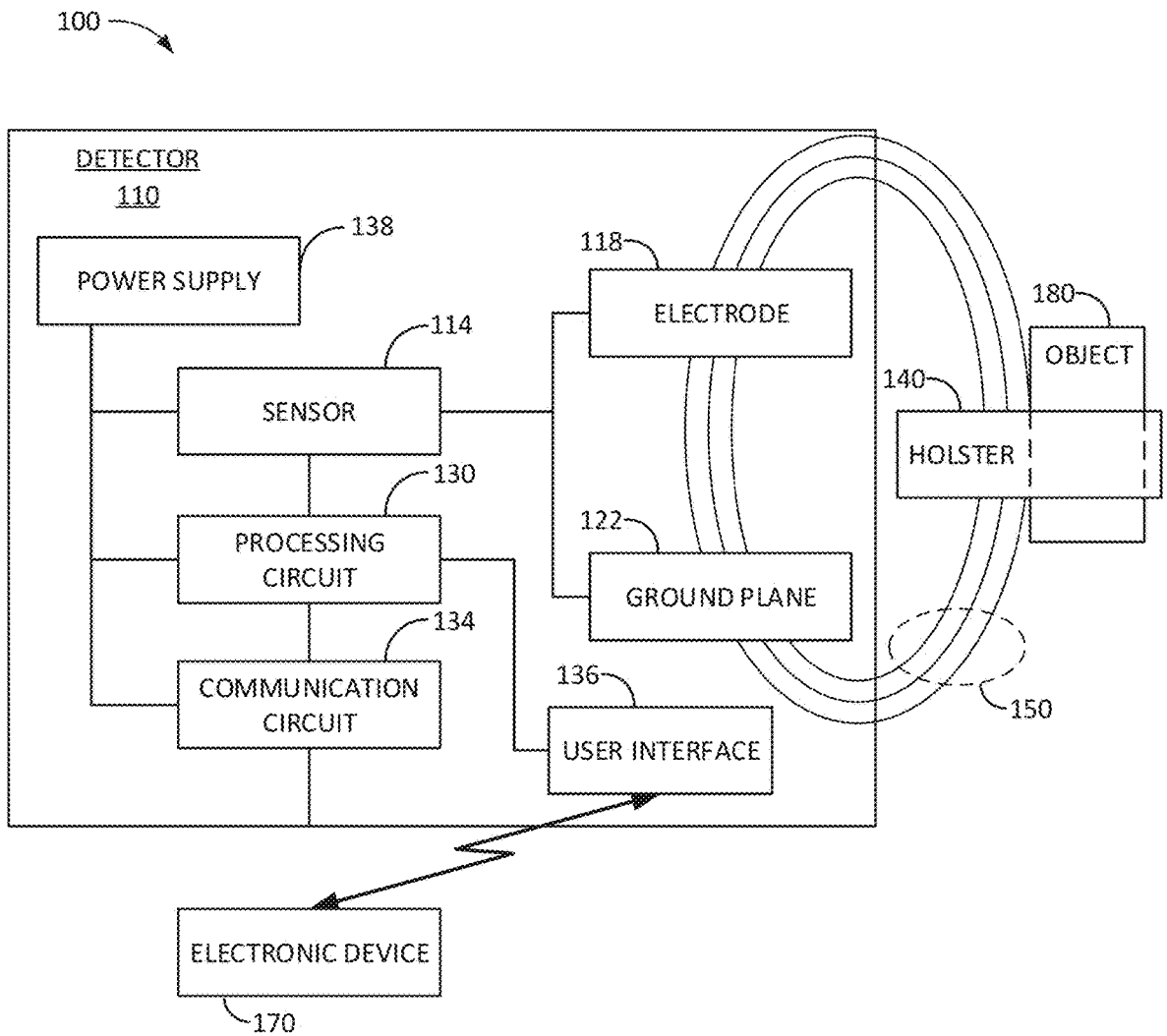
FIG. 1 is a functional block diagram of a detector that cooperates with a holster, a weapon, electronic devices to create a system for detecting the weapon and providing notices to the electronic devices according to various aspects of the present invention.

For self-defense and/or law enforcement purposes, a person may carry a weapon in a holster. A person may also carry an electronic device that can record the sights and sounds, or other physical events, that occur in the vicinity of the person (e.g., user, operator). The information recorded by the recorder may be captured from the user's point of view.

A user may carry objects other than weapons in a holster. Such objects may include flashlights, medical tools (e.g., forceps, shears, scissors, penlight), firefighting tools (e.g., axes), radios, mobile devices, cameras, and/or tools.

A detector may cooperate with a holster to detect the status of an object with respect to the holster. Detecting the status of an object includes detecting the insertion, withdrawal (e.g., removal), and/or presence of the object in the holster. A detector may provide status information to an electronic device. A detector may record the status of the object with respect to the holster such as recording the detection of insertion, withdrawal, or the presence of the object in a holster. Information recorded by a detector may include the date and time of recording the status of detecting.

According to various aspects of the present invention, detecting the status of an object with respect to a holster permits cooperation between the detector, the holster, the object, and electronic devices. For example, a detector may provide a notice (e.g., report status) to an electronic device upon the removal or return of the object to the holster. Responsive to the notice of the status of the object with respect to the holster, the electronic device may determine whether to perform an operation. For example, a recording device may decide to start recording upon receiving a notice of a particular status, such as withdrawal of the object from the holster.

A holster includes any apparatus for supporting (e.g., carrying) an object on a person (e.g., on user's body). An object may be a weapon. A weapon includes any conventional device for protecting oneself or others such as a firearm, a knife, a stun gun, a pepper spray dispenser, baton, truncheon, nightstick, and a conducted electrical weapon. As discussed above, a holster may support objects other than weapons. A holster may be formed in any conventional manner to suitably support one or more objects and/or types of objects. A holster may include a bay for receiving and/or supporting an object for carrying the object. A detector may cooperate with a holster to sense the presence or absence of an object in the bay. The terms bay and holster are used interchangeably to indicate an apparatus for carrying an object on a person.

According to various aspects of the present invention, a detector includes the capability to detect insertion into, removal from, and/or the presence of an object in a holster. A detector further includes a transmitter to transmit (e.g., broadcast) a message regarding the status of the object with respect to the holster (e.g., inserted, withdrawn, present, absent, being inserted, being withdrawn). A detector may further include a sensor for detecting the position and/or operation of a locking device (e.g., holster lock, locking mechanism) that secures (e.g., locks) the object in the holster. A holster may include one or more locking mechanisms that secure the object in the bay of the holster so that the object may not be removed from the holster without releasing the one or more locking mechanisms. A locking mechanism may decrease the likelihood that the object may be removed from the bay without the consent of the user.

A locking mechanism may have an unlocked state (e.g., position) and a locked state. A locking mechanism may move between a locked state and an unlocked state. A user of the holster and/or object may manually move the locking mechanism between the locked and unlocked states. While in a locked state, the locking mechanism mechanically retains the object in the bay of the holster. While in an unlocked state, the locking mechanism does not mechanically retain the weapon in the bay of the holster or interfere with removal of the object from the holster. A holster may include one or more locking mechanisms that may be operated by a user in a single manual movement or in separate movements. A locking mechanism may be biased in a locked position, so that a force must be applied to move the locking mechanism from the locked position to the unlocked position and removal of the force permits the locking mechanism to move from the unlocked to the locked position. A holster lock sensor may cooperate with other elements of a detector.

A detector includes any apparatus that cooperates with a holster for detecting the presence of an object in a bay of the holster and/or the position of a locking mechanism. A detector may attach to a holster. A detector may be an incorporated into the structure of a holster. A detector does not hinder (e.g., interfere, block) the insertion or removal of an object from a holster. A detector may maintain a record of object insertions and/or removals. A detector may include any circuitry, electrical, and/or electronic component for performing a function. A detector may communicate with an electronic device.

An electronic device (e.g., mobile device, smartphone, tablet, laptop, personal digital assistant, camera, body camera, vehicle camera, microphone, digital video recorder, mobile data terminal) may communicate (e.g., transmit, receive, exchange, transfer) information with a detector. An electronic device and a detector may communicate with each other using any conventional wired or wireless communication protocol. The electronic device may further communicate with other devices (e.g., website server, camera, audio and/or video recorder, computer).

A detector may cooperate with a holster, an object, and/or electronic devices to establish a system for detecting the status of the object, providing notices regarding the status of the object, recording status information, providing recorded status information, and/or updating software (e.g., firmware) of the devices of the system.

For example, according to various aspects of the present invention, system 100, shown in FIG. 1, may include detector 110, holster 140, electronic device 170, and object 180. Detector 110 may include sensor 114, electrode 118, ground plane 122, processing circuit 130, communication circuit 134, user interface 136 and power supply 138. Detector 110, holster 140, object 180, and electronic device 170 may perform the functions of a detector, a holster, an object, and an electronic device respectively as discussed above.

A sensor may sense (e.g., determine, identify, detect) a magnitude of a capacitance (e.g., amount of stored electric charge, ability to store an electric charge). A sensor may sense a magnitude of a capacitance or a change in the magnitude of the capacitance between one or more electrodes and a ground plane. For example, sensor 114 senses a magnitude of a capacitance (e.g., amount of stored charge, ability to store charge) and/or change in the magnitude of the capacitance between electrode 118 and ground plane 122. Holster 140 cooperates with electrode 118 and ground plane 122 to affect (e.g., alter, change, influence) a magnitude of the capacitance.

An electrode includes any electrical conductor capable of cooperating with another conductor to form a capacitor (e.g., condenser). The other conductor may include a ground plane. A ground plane includes any electrical conductor capable of cooperating with an electrode for forming a capacitor. A capacitor stores electrical energy (e.g., charge) in an electric field. A capacitor may temporarily store electric energy in an electric field. The amount of charged stored in the electric field and/or the electric field may change. The electrode and ground plane may be separated by a distance. The material positioned around and/or within the area that separates the electrode and the ground plane does not conduct electricity and is referred to as a dielectric. The electric field, and its associated magnetic field, exists in the dielectric between the conductors (e.g., electrode and ground plane). The charge is stored in the electric field. The ability to store a quantity of electric charge is referred to as capacitance.

An electrode's geometry, size, material, thickness, and layout may affect the capacitance. For example, electrode 118 may be a pattern of conductive tracks on a first surface (e.g., top) of a printed circuit board ("PCB"). The pattern of tracks may be solid. The pattern may be a crosshatch (e.g., intersecting lines) of tracks. A ground plane may be a substantially flat surface of conductive material on a PCB in parallel with an electrode. A ground plane may be on a second surface or an inner layer of a PCB. A ground plane's geometry, size, material, thickness, and layout may affect the capacitance. A ground plane may be connected to the electrical ground of the circuitry of a detector. For example, ground plane 122 may be a pattern of conductive tracks on a second surface (e.g., bottom) of a PCB, opposite that of an electrode on the top surface. The pattern of tracks may be solid. The pattern may be a crosshatch of tracks. Ground plane 122 and electrode 118 cooperate to form a capacitance that is sensed by sensor 114.

The dielectric between and around an electrode and a ground plane is an electrical insulator that may be polarized by an applied electric field. The degree to which a dielectric may be polarized is referred to as its relative permittivity (e.g., dielectric constant). The permittivity of a dielectric is determined by its electric susceptibility, a measure of how easily it polarizes in response to an electric field.

The dielectric of a detector may include the housing (e.g., enclosure, packaging) of a detector, the holster material between the detector and an object in the bay of a holster, the object in the holster, and any air gaps between these elements. Factors influencing the permittivity include the thickness and type of material of the holster and detector housing, the characteristics (e.g., type of material, size, geometry, thickness) of the object carried by the holster, and the physical attributes of any air gaps. For example, in system 100, electric field 150 is established by electrode 118 and ground plane 122. Electric field 150 traverses holster 140. The dielectric of the capacitance detected by sensor 114 includes each of the elements that electric field 150 polarizes.

Figure 2:
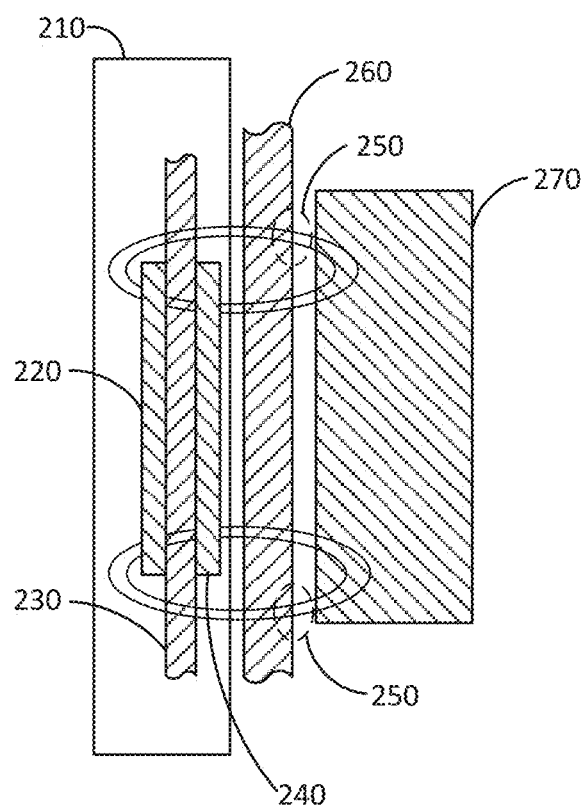
FIG. 2 is cross section of the detector, holster, and weapon of FIG. 1.

In an implementation, a cross section of system 100, shown in FIG. 2, includes detector housing 210, electrode 240 on a first side of PCB 230, ground plane 220 on a second side of PCB 230, wall 260 of a holster, and object 270. Electrode 240 and ground plane 220 create electric field 250 which polarizes the dielectric that includes detector housing 210, PCB 230, wall 260, and object 270 carried in the bay of the holster. The permittivity of the dielectric differs according to presence or absence of object 270. Thus, the capacitance detected by sensor 114 is dependent on whether object 270 is in the holster or out of the holster. The magnitude of capacitance and/or difference in magnitude is detected by sensor 114.

A sensor may periodically (e.g., cyclically, systematically, at intervals) sense a magnitude of the capacitance or a change in the magnitude of the capacitance. A sensor may compare a sensed capacitance against a baseline (e.g., no object in the bay of a holster) capacitance. A sensor may calibrate (e.g., measure, determine) a baseline. A sensor may automatically calibrate a baseline using a predetermined number of previous capacitance measurements.

A sensor includes any circuitry and/or electrical or electronic component for sensing a capacitance. A sensor may include, be controlled by, and/or cooperate with a processing circuit to sense a capacitance and to perform the functions of a sensor. A sensor may include an application specific integrated circuit, a programmable logic device, logic circuitry, state machines, MEMS devices, conventional passive electronic devices, signal conditioning circuitry, communication circuitry, data buses, address buses, and/or any combination thereof to perform the function of sensing.

A sensor may provide and/or receive electrical signals whether digital and/or analog in form. A sensor may provide and/or receive digital information via a conventional bus using any conventional protocol. A sensor may receive information, manipulate the received information, and provide the manipulated information. A sensor may have a low power state in which only a portion of its circuits operate or the processing circuit performs only certain functions. A processing circuit may be switched (e.g., awoken) from a low power state to a higher power state in which more or all of its circuits operate or the processing circuit performs additional functions or all of its functions.

A sensor may sense a capacitance by determining a frequency of a variable frequency oscillator ("VFO"). For example, the VFO may provide (e.g., output, source) an oscillating (e.g., periodic) electrical signal with a frequency dependent on a magnitude of the capacitance sensed between electrode 118 and ground plane 122.

A sensor may sense a capacitance by measuring a time related to charging the capacitance or a time related to the loss (e.g., decay) of charge on the capacitance. For example, by applying a constant voltage to electrode 118 with respect to ground plane 122, a magnitude, or change in magnitude, of capacitance may be determined. A time is measured from the application of the voltage to the time the voltage on electrode 118 reaches or decays to a certain percentage of the applied voltage. The time interval is referred to as a time constant. If a resistance, R, in ohms, is in series the capacitance, C, in farads, the time constant, $\tau$, is proportional to the product R·C.

A sensor may sense a capacitance or change in capacitance by any conventional capacitance measurement technique. Other examples of capacitance measurement techniques include sensing by applying a square wave voltage across the capacitance, application of a sine wave voltage across the capacitance, and resonance measurement.

Sensor 114 may cooperate with processing circuit 130 to detect a capacitance and/or a change in capacitance to detect the presence or absence of an object in the bay of a holster.

A processing circuit includes any circuitry and/or electrical or electronic component for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, data buses, address buses, and/or any combination thereof for performing a function of a processing circuit and/or executing one or more stored programs.

A processing circuit may include conventional passive electronic devices (e.g., resistors, capacitors, inductors) and/or active electronic devices (e.g., op amps, comparators, analog-to-digital converters, digital-to-analog converters, programmable logic, SRCs, diodes, transistors). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. A processing circuit may store information in and retrieve information from a conventional memory (e.g., RAM, ROM, EEPROM). Information received, stored, and/or manipulated by the processing circuit may be used to perform a function, control a function, and/or to execute a stored program.

A processing circuit may have a low power state in which only a portion of its circuits operate or the processing circuit performs only certain functions. A processing circuit may be switched (e.g., awoken) from a low power state to a higher power state in which more or all of its circuits operate or the processing circuit performs additional functions or all of its functions.

As discussed above, a processing circuit may cooperate with other components (e.g., sensor, communication circuit) to perform a function. A processing circuit may control the operations of, in whole or in part, other components. A processing circuit may control the operation and/or function of other circuits and/or components of a detector. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus.

Processing circuit 130 performs the function of a processing circuit as discussed above. For example, sensor 114 provides capacitance information to processing circuit 130 and processing circuit 130 determines the position of an object in holster 140. Processing circuit 130 may cooperate with sensor 114 to calibrate sensor 114. Processing circuit may record calibration information. Processing circuit may make a historical record of the operation of sensor 114 for reference and for providing a record of the operation of detector 110.

Processing circuit 130 may provide instructions to power supply 138 to control the power provided to sensor 114, communication circuit 134, and user interface 136. Processing circuit 130 may control the operation of communication circuit 134. Processing circuit 130 may perform all or a part of the functions of communications circuit 134. Processing circuit 130 may receive user commands from a user via user interface 136. Processing circuit may provide status information for display to a user through user interface 136.

A user interface may include one or more controls that permit a user to interact with, communicate with, and/or control the operation of, in whole or part, of a detector. A user interface on a detector may permit a user of the detector to control some functions of an electronic device that communicates with the detector.

A user interface may include one or more controls to permit a user to provide information to a detector. A control includes any electromechanical device for manual operation by a user. An electromechanical device permits a user to establish (e.g., close) or break (e.g., open) an electrical circuit. A control may include any type of conventional switch. A control may include a portion of a touch screen or additional capacitive sensors to detect external finger presses. Operation of a control may occur by the selection of a portion of the touch screen.

A processing circuit may detect the existence or the absence of the electrical circuit. A processing circuit may detect the operation of a control. A processing circuit may perform an operation responsive to operation of a control. A processing circuit may perform a function, halt a function, resume a function, or suspend a function of the device of which the control and the processor are a part.

A user interface may provide information to a user. A user may receive visual, haptic, and/or audible information via a user interface. A user may receive visual information via devices that visually display (e.g., present, show) information (e.g., LCDs, LEDs, light sources, graphical and/or textual display, display, monitor, touchscreen). A user interface may provide an indication to the user that an object is positioned in the bay of a holster. A user may receive information as to the status and/or operation of a detector via an electronic device. A detector may send information to an electronic device and the information may be presented to the user on a display of the electronic device.

User interface 136 performs the functions of a user interface discussed above. For example, user interface 136 displays a light of a first color to indicate that an object has been withdrawn from the holster and a light of a second color to indicate that an object has been inserted into the holster. A third color or a flashing light indicates a low battery level. In another implementation, user interface 136 includes a control to instruct processing circuit 130 to instruct sensor 114 to initiate calibration. Responsive to a user control, processing circuit 130 may cooperate with communication circuit 134 to establish communication with electronic device 170.

A communication circuit transmits and/or receives information. A communication circuit may transmit and/or receive (e.g., communicate) information via a wireless link and/or a wired connection. A communication circuit may communicate using wireless (e.g., radio, light, sound, vibrations) and/or wired (e.g., electrical, optical) mediums. A communication circuit may communicate using any conventional wireless (e.g., Bluetooth, Zigbee, WAP, WiFi, Near Field Communication, infrared, IrDA) and/or any conventional wired (e.g., USB, RS-232, Firewire, Ethernet, I2C) communication protocol. A communication circuit may receive information from a processing circuit for transmission. A communication circuit may provide received information to a processing circuit.

A communication circuit in one device (e.g., detector) may communicate with a communication circuit in an electronic device. Communications between two devices may permit the two devices to cooperate in performing a function of either device. Information transferred between a detector and an electronic device may be encrypted (e.g., encoded, enciphered).

A communication circuit enables a detector to communicate with an electronic device. The electronic device may exchange information with the detector. Information provided by the detector may include the status of the holster and/or the status of the holster with respect to an object. Holster status may include the condition (e.g., state) of an object being removed from a holster, the object is removed from a holster (e.g., holster empty), an object being inserted into a holster, and/or the object is inserted into the holster (e.g., holster occupied). A communication circuit may further transmit insertion and/or removal data (e.g., logs, history), detector information (e.g., manufacturer, serial number, software version, power supply type), detector status (e.g., on/off, amount of energy used or remaining in the power supply), and calibration information (e.g., establishment of capacitance baseline). Information provided to the detector may include commands (e.g., instructions), configuration information, calibration request, and software updates.

Communication circuit 134 may perform the functions of a communication circuit discussed above. Communication circuit 134 may include one or more transceivers for wireless communication. Communication circuit 134 may communicate with an electronic device.

In an implementation, communication circuit 134 communications with an electronic device. Using, for example, Bluetooth Low Energy ("BLE"), communication circuit 134 may advertise (e.g., transmit a beacon, broadcast) its unique identifier to a BLE enabled electronic device. An application on the electronic device may scan for identifiers. If an identifier is found, the communication circuit 134 and the electronic device may authenticate one another and establish a secure communication channel. The communication channel may encrypt (e.g., protect against unauthorized access) all or some of the data (e.g., messages, information) transferred between the communication circuit and the electronic device.

In the case of a camera, the camera may receive holster status information. The camera may activate audio and/or video recording upon detecting a particular status of a holster.

An electronic device may record other information related to the insertion or withdrawal of an object from the holster. The electronic device may receive log and/or history from the detector. The electronic device may, in turn, establish a secure and/or encrypted communication channel with a website and forward information from the detector to the website. The transfer of information may conform to evidentiary rules.

A power supply provides power (e.g., energy). For a detector, a power supply provides electrical power. Providing electrical power may include providing a current at a voltage. Electrical power from a power supply may be provided as a direct current ("DC") and/or an alternating current ("AC"). A power supply may include a battery. A power supply may provide energy for performing the functions of a detector. A power supply may provide the energy for a voltage to charge the capacitor formed by an electrode and ground plane. A power supply may provide energy for operating the electronic and/or electrical components (e.g., parts, subsystems, circuits) of a detector. The energy of a power supply may be renewable (e.g., one or more rechargeable batteries, motion) or exhaustible. A power supply may be replaceable. The energy from a power supply may be converted from one form (e.g., voltage, current, magnetic) to another form to perform the functions of a detector.

Power supply 138 performs the function of a power supply discussed above. For example, power supply 138 provides power for the operation of sensor 114, processing circuit 130, communication circuit 134, and user interface 136. Power supply 138 provides energy for electrode 118 to establish an electric field.

A processing circuit may manage the operation of the components of a detector to reduce the amount of energy used from the power supply. Processing circuit 130 operates in a low power state, as discussed above, to reduce the amount of energy used from power supply 138. Processing circuit may measure and/or deduce the status of power supply 138 include the amount of power that remains in power supply 138. Processing circuit 130 may report (e.g., provide a notice) the status of power supply 138. Processing circuit 130 may estimate an amount of time before power supply should be recharged or until it is depleted.

In an implementation, detector 110 may include a holster lock detector (not shown). A lock detector cooperates with processing circuit 130 to report the position of a holster locking mechanism. For example, a reed switch (e.g., an electrical switch operated by an applied magnetic field) attaches to the locking mechanism. A magnet is attached to the holster opposite the reed switch. The reed switch detects the position of the lock with respect to the magnet. The reed switch connects to processing circuit 130 which determines the position of the switch and thus the locking mechanism. In another implementation, a Hall effect sensor (e.g., a transducer that varies its output voltage in response to a magnetic field) may be attached to the holster and a magnet to the locking mechanism. Unlocking of the holster locking mechanism places the magnet further from the Hall effect sensor, thus changing the sensor's output voltage. Responsive to the change in voltage, processing circuit 130 determines the whether the holster is locked or unlocked. In another implementation, the holster lock detector is a mechanical switch so that when locked the switch is closed and when unlocked the switch is opened, or vice versa.

Figure 3:
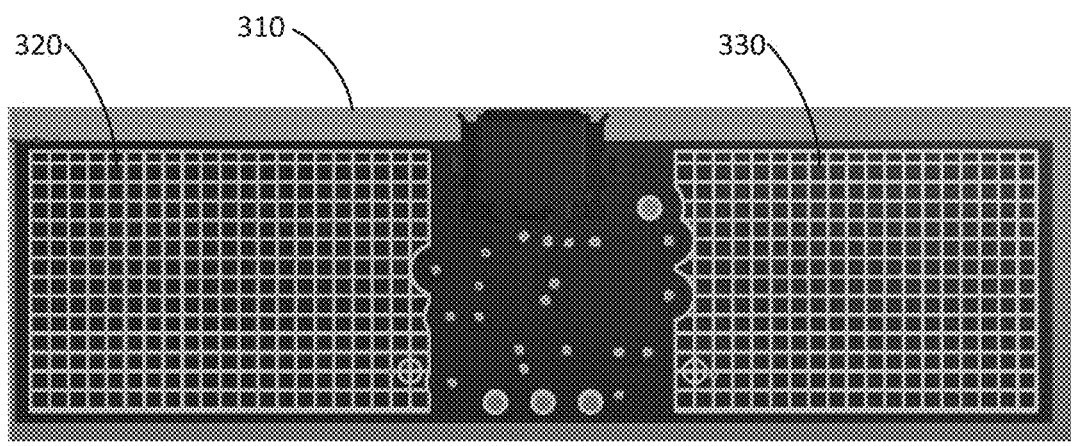
FIG. 3 is an implementation of a first side the detector of FIG. 1.
Figure 4:
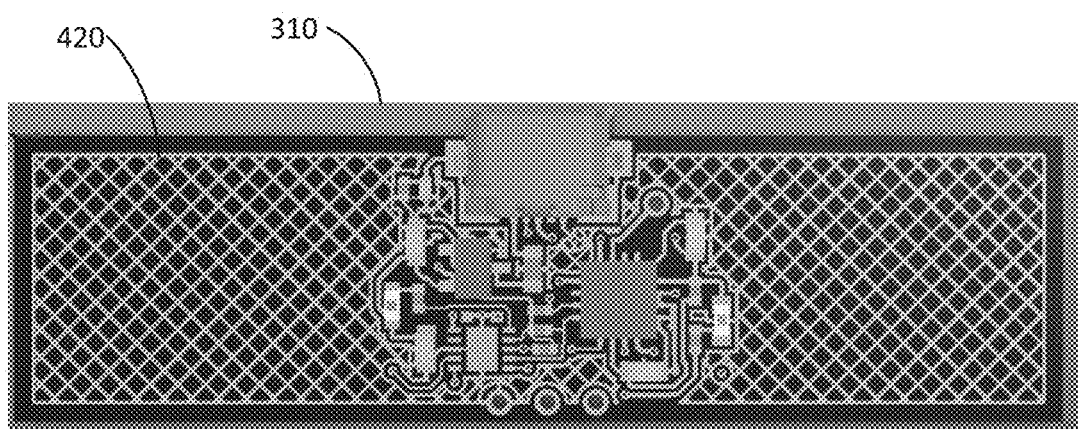
FIG. 4 is an implementation of a second side of the detector of FIG. 1.

In an implementation of detector 110, PCB 310, shown in FIG. 3, includes electrodes 320 and 330 on a first side. On a second side, ground plane 420 of PCB 310, shown in FIG. 4, forms a common ground to both electrodes 320 and 330. Electrodes 320 and 330 are constructed with a rectangular cross hatch pattern of conductive traces. Ground plane 420 is constructed with a diagonal cross hatch covering nearly the full length and width of a side of the PCB with space left for circuit components and connections. Electrodes 320 and 330, and ground plane 420 may be covered with a protective insulating layer that becomes part of the dielectric.

The electric field established between electrodes 320 and/or 330 and ground plane 420 (e.g., electric field 250) polarizes the dielectric that includes the detector housing, PCB 310, the wall of the holster, and the object when positioned in the holster as discussed above. Sensor 114 detects the capacitance and changes in capacitance established between electrodes 320 and/or 330, ground plane 420, and the dielectric to detect the presence or absence of an object in the holster.

Figure 5:
FIG. 5 is an implementation of the detector of FIG. 1 attached to a holster that holds a conventional firearm.

In an implementation, holster 510, shown in FIG. 5, holds object 520. Holster 510 may include holster locking mechanism 530. Detector 540 attaches (e.g., affixes, couples, fastens, binds) to the exterior of holster 510. Detector 540 is separated from object 520 by a wall of holster 510. Detector 540, holster 510, and locking mechanism 530 perform the functions of a detector, a holster, and a holster locking mechanism as discussed above. Detector 540 may be attached with adhesives (e.g., glue, epoxy) to holster 510. Detector 540 may be secured (e.g., slid in, clipped in) to a fixture on holster 510. Any conventional method of securing detector 530 a holster may be used.

Detector 540 detects the removal of object 520 (e.g., a conventional firearm) from holster 510. In an implementation, detector 540 detects the operation of locking mechanism 530 while object 520 is in holster 510 as an indication that object 520 may be withdrawn from holster 510. Detecting an operation of locking mechanism 530 may be the trigger needed by a processing circuit of detector 540 to exit a low power state and to enter a state in which all components of detector 540 are fully functional. Holster 510 is formed of a material that permits a wall of holster 510 to be perform the function of a dielectric as discussed above so that detector 540 may detect the withdrawal and insertion of object 520 from and into respectively holster 510.

In an implementation, detector 540 communicates with a camera (e.g., electronic device) worn by the user of object 520 who also wears holster 510. Detector 540 reports the status of holster 510 to the camera. When the camera receives a status message from holster 510 that indicates that object 520 has been removed from holster 510, the camera assesses the status in the message and determines that it should start recording because an incident involving the user and the object 520 may be imminent. When the camera receives a status message that object 520 has been returned to holster 510, the camera may assess the status, so it may determine whether it should or should not stop recording. In an implementation, a camera does not stop recording when it receives a status message that object 520 has been returned to holster 510 because the incident that started recording may not be fully terminated.

In an implementation, detector 540 keeps a record (e.g., log) of status it has detected, information about the operation of detector 540 (e.g., battery level, message sent, identity of device with which it communicates, software upgrades). Detector 540 further tracks time (e.g., time, date, relative, absolute) and records the time associated with the occurrence of an operation, status, or recoding of information in the log. Detector 540 establishes communication with a smartphone, tablet, or computer to transmit all or part of the record to a server, such as an evidence management server.

In an implementation, detector 540 communicates with a smartphone, tablet, or computer to receive a software upgrade to the program executed by the processing circuit of detector 540.

In the event that detector 540 includes a power supply (e.g., battery) that cannot be recharged, detector 540 may be removed from holster 510 so that the battery may be replaced or detector 540 may be replaced entirely. The processing circuit of detector 540 may periodically enter a low power mode to reduce the amount of power used from the battery to length the life of the battery.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The location indicators "herein", "hereunder", "above", "below", or other word that refer to a location, whether specific or general, in the specification shall be construed to refer to any location in the specification where the location is before or after the location indicator.

What is claimed is:

1. A detector for detecting whether a provided object is positioned in a provided holster, the detector for coupling to the holster, the detector comprising:
   a capacitor, the capacitor including:
      an electrode, the electrode formed of a first plurality of conductive traces arranged in a rectangular cross-hatch pattern;

a ground plane, the ground plane formed of a second plurality of conductive traces arranged in a diagonal crosshatch pattern with respect to the rectangular crosshatch pattern of the electrode; and a dielectric, at least a portion of the dielectric positioned between the electrode and the ground plane, a position of the object with respect to the holster determines a permittivity of the dielectric thereby determining a capacitance of the capacitor; and a sensor;

a processing circuit; and a transmitter; wherein:
while the object is positioned in the holster, the object establishes a first permittivity of the dielectric to establish a first capacitance of the capacitor;
while the object is removed from the holster, an absence of the object establishes a second permittivity of the dielectric to establish a second capacitance of the capacitor;
the sensor is configured to provide a signal responsive to detecting at least one of the first capacitance and the second capacitance; and
responsive to the signal, the processing circuit is configured to instruct the transmitter to transmit a message that includes indicia of whether the object is positioned in the holster or is removed from the holster.

2. The detector of claim 1 wherein:
the sensor is configured to provide the signal responsive to detecting the first capacitance; and
the message includes indicia that the object is positioned in the holster.

3. The detector of claim 1 wherein:
the sensor is configured to provide the signal responsive to detecting the second capacitance; and
the message includes indicia that the object is removed from the holster.

4. The detector of claim 1 wherein responsive to receiving the signal, the processing circuit is further configured to record at least one of a date and a time of receipt of the signal and whether the object was positioned in or out of the holster.

5. The detector of claim 4 wherein the processing circuit is configured to instruct the transmitter to transmit at least one of the date and the time of receipt of the signal and whether the object was positioned in or out of the holster.

6. The detector of claim 1 wherein a magnitude of the first capacitance is less than a magnitude of the second capacitance.

7. The detector of claim 1 wherein a magnitude of the first capacitance is greater than a magnitude of the second capacitance.

8. The detector of claim 1 wherein a wall of the holster is formed of a non-conductive material.

9. The detector of claim 1 wherein the sensor is configured to periodically detect at least one of the first capacitance and the second capacitance.

10. The detector of claim 1 wherein the sensor is configured to be calibrated to establish a baseline for at least one of the first capacitance and the second capacitance.

11. A detector for coupling to a provided holster, the holster for holding a provided firearm, the detector comprising:
an electrode, the electrode formed of a first plurality of conductive tracks arranged in a rectangular crosshatch pattern;
a ground plane, the ground plane formed of a second plurality of conductive tracks arranged in a second pattern with respect to the rectangular crosshatch pattern of the electrode;
a dielectric, at least a portion of the dielectric positioned between the electrode and the ground plane; and
a sensor; wherein:
the electrode, the ground plane, and the dielectric cooperate to form a capacitor, a presence or an absence of the firearm in the holster determines a permittivity of the dielectric thereby determining a capacitance of the capacitor;
the presence of the firearm in the holster establishes a first permittivity of the dielectric to establish a first capacitance of the capacitor;
the absence of the firearm from the holster establishes a second permittivity of the dielectric to establish a second capacitance of the capacitor; and
responsive to a magnitude of the first capacitance and a magnitude of the second capacitance, the sensor is configured to detect removal of the firearm from the holster.

12. The detector of claim 11 wherein the magnitude of the first capacitance is less than the magnitude of the second capacitance.

13. The detector of claim 11 wherein the magnitude of the first capacitance is greater than the magnitude of the second capacitance.

14. The detector of claim 11 wherein a wall of the holster is formed of a non-conductive material.

15. A detector for detecting whether a provided object is positioned in a provided holster, the holster includes a locking mechanism for manual operation by a user between a locked state and an unlocked state, the locking mechanism configured to secure the object in the holster while in the locked state and to permit removal of the object from the holster while in the unlocked state, the detector comprising:
a capacitor, the capacitor including:
an electrode, the electrode formed of first conductive traces arranged in a rectangular crosshatch pattern;
a ground plane, the ground plane formed of second conductive traces arranged in a second pattern with respect to the rectangular crosshatch pattern of the electrode; and
a dielectric, at least a portion of the dielectric positioned between the electrode and the ground plane, a position of the object with respect to the holster determines a permittivity of the dielectric thereby determining a capacitance of the capacitor;
a sensor;
a locking mechanism detector;
a processing circuit; and
a transmitter; wherein:
while the object is positioned in the holster, the object establishes a first capacitance of the capacitor;
while the object is removed from the holster, an absence of the object establishes a second capacitance of the capacitor;
the sensor is configured to provide a first signal responsive to detecting at least one of the first capacitance and the second capacitance;
the locking mechanism detector is configured to provide a second signal responsive to detecting at least one of the locked state and the unlocked state of the locking mechanism; and
responsive to the first signal and the second signal, the processing circuit is configured to instruct the transmitter to transmit a message that includes indicia of whether the object is positioned in the holster or is removed from the holster.

16. The detector of claim 15 wherein the dielectric comprises a portion of a printed circuit board.

17. The detector of claim 1 wherein the dielectric comprises a portion of a printed circuit board.

18. The detector of claim 11 wherein the dielectric comprises a portion of a printed circuit board.

* * * * *